(No Model.)
E. B. ISBELL.
DOUGH BOARD.
No. 445,019. Patented Jan. 20, 1891.
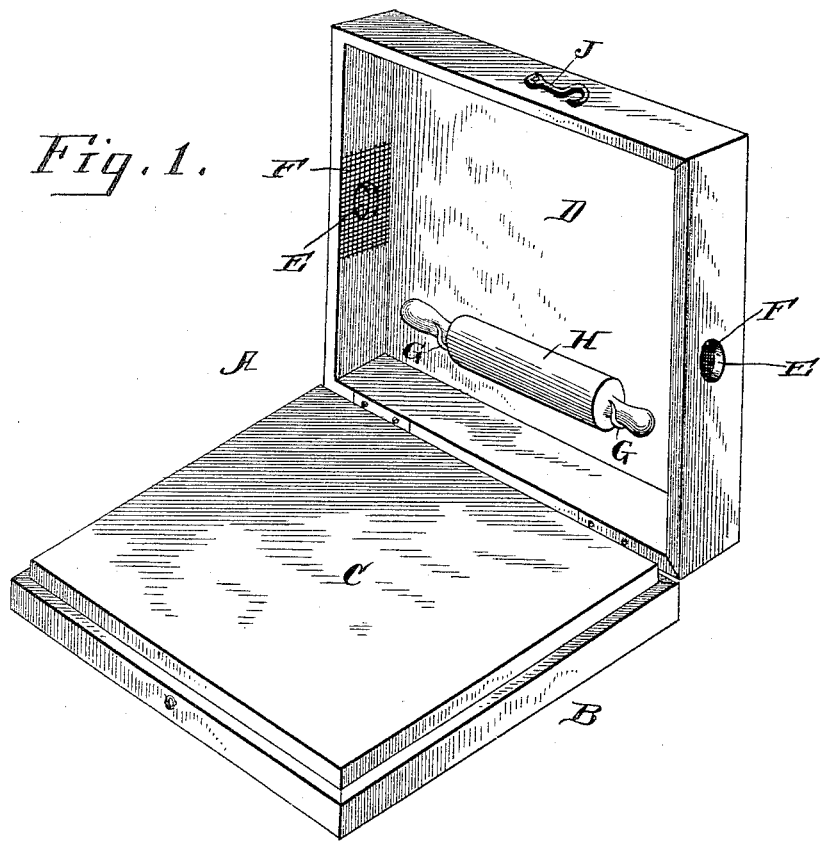
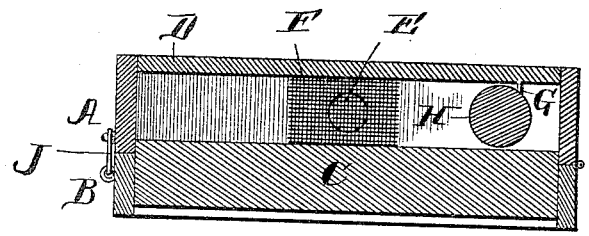
Witnesses:
J. B. McGirr.
Y. M. Copenhaver.
Enoch B. Isbell.
INVENTOR.
by Wm. A. Moore
Attorney.

UNITED STATES PATENT OFFICE.

ENOCH BURY ISBELL, OF PARIS, TENNESSEE.

DOUGH-BOARD.

SPECIFICATION forming part of Letters Patent No. 445,019, dated January 20, 1891.

Application filed November 10, 1890. Serial No. 370,927. (No model.)

*To all whom it may concern:*

Be it known that I, ENOCH BURY ISBELL, a citizen of the United States of America, residing at Paris, in the county of Henry and State of Tennessee, have invented certain new and useful Improvements in Dough-Boards, of which the following is a specification, reference being had therein to the accompanying drawings.

My invention relates to improvements in dough-boards; and the object of my invention is the provision of an article of this character upon which the dough can be readily kneaded or rolled and which will protect the dough from dirt and insects.

A further object of my invention is the provision of a dough-board which will possess merit in point of simplicity, efficiency, and cheapness.

To attain the desired objects the invention consists of the device constructed as herein illustrated, described, and specifically claimed.

Figure 1 represents a perspective view of my improved device, and Fig. 2 represents a vertical section thereof.

Referring by letter to the drawings, A designates my improved dough-board, which consists of the hinge-base B, the dough-board proper C, which projects above the base, and the top or cover D.

The top or cover is provided in its side walls with openings E, which are covered by gauze or screen F, the purpose of said openings being to admit air to the dough for obvious reasons.

To the inside of the top or cover are attached staples, hangers, or brackets G, upon which the rolling-pin H is supported, and a suitable fastening J is provided for the cover.

The manner of using my device will be readily apparent from the foregoing description, taken in connection with the accompanying drawings.

The dough-board projects above the base, permitting the dough to be readily and easily kneaded thereon, and allows the board to be easily cleaned. When it is desired to leave the dough for a time, the cover effectually prevents the contact of dirt or insects and allows the access of air to keep the dough pure and fresh. The rolling-pin is always convenient to the user of the device.

It is evident that I provide a device of this character which possesses all the features of merit calculated to commend it as useful and economical, and hence further comment is unnecessary herein.

I claim as my invention—

1. The herein-described dough-board, consisting of the base having the dough-board projecting above the same, the cover hinged to said base and having the openings in the side, and the screens covering said openings.

2. The herein-described dough-board, consisting of the base having the dough-board projecting above the same, the cover hinged to the base and provided with ventilating-openings, and the supports or hangers on the lid for the rolling-pin.

In testimony whereof I affix my signature in presence of two witnesses.

ENOCH BURY ISBELL.

Witnesses:
 W. E. WELDON,
 W. R. LASATER.